United States Patent
Johnson

(10) Patent No.: US 10,522,862 B2
(45) Date of Patent: Dec. 31, 2019

(54) THERMO-ELECTROCHEMICAL CONVERTER

(71) Applicant: Johnson IP Holding, LLC, Atlanta, GA (US)

(72) Inventor: Lonnie G. Johnson, Atlanta, GA (US)

(73) Assignee: Johnson IP Holding, LLC, Atlanta, GA (US)

( * ) Notice: Subject to any disclaimer, the term of this patent is extended or adjusted under 35 U.S.C. 154(b) by 309 days.

(21) Appl. No.: 15/503,255

(22) PCT Filed: Aug. 10, 2015

(86) PCT No.: PCT/US2015/044435
§ 371 (c)(1),
(2) Date: Feb. 10, 2017

(87) PCT Pub. No.: WO2016/025372
PCT Pub. Date: Feb. 18, 2016

(65) Prior Publication Data
US 2017/0237105 A1    Aug. 17, 2017

Related U.S. Application Data

(60) Provisional application No. 62/035,560, filed on Aug. 11, 2014.

(51) Int. Cl.
*H01M 8/00* (2016.01)
*H01M 8/18* (2006.01)
*H01M 14/00* (2006.01)

(52) U.S. Cl.
CPC ........... *H01M 8/182* (2013.01); *H01M 14/00* (2013.01)

(58) Field of Classification Search
CPC .. H01M 8/182; H01M 14/00; H01M 8/04074; H01M 8/04029
See application file for complete search history.

(56) References Cited

U.S. PATENT DOCUMENTS 4,808,494 A    2/1989  Palmer et al.
7,160,639 B2   1/2007  Johnson et al.
(Continued)

FOREIGN PATENT DOCUMENTS

JP    S60143575 A    7/1985
JP    H05225990 A    9/1993
(Continued)

OTHER PUBLICATIONS

Office Action dated Apr. 16, 2018 in KR Application No. 10-2017-7006589 (Partial English Translation).
(Continued)

*Primary Examiner* — Cynthia H Kelly
*Assistant Examiner* — Monique M Wills
(74) *Attorney, Agent, or Firm* — Panitch Schwarze Belisario & Nadel LLP

(57) ABSTRACT

A thermo-electro-chemical converter direct heat to electricity engine has a monolithic co-sintered ceramic structure or a monolithic fused polymer structure that contains a working fluid within a continuous closed flow loop. The co-sintered ceramic or fused polymer structure includes a conduit system containing a heat exchanger, a first high density electrochemical cell stack, and a second high density electrochemical cell stack.

17 Claims, 8 Drawing Sheets

(56) References Cited

U.S. PATENT DOCUMENTS

| | | | |
|---|---|---|---|
| 7,943,250 B1 | 5/2011 | Johnson et al. | |
| 2002/0012824 A1 | 1/2002 | Johnson | |
| 2008/0014476 A1* | 1/2008 | Kratschmar | H01M 8/04089 |
| | | | 429/429 |
| 2009/0197129 A1* | 8/2009 | Shimoi | H01M 8/04089 |
| | | | 429/429 |
| 2012/0064419 A1 | 3/2012 | Johnson | |
| 2012/0141904 A1 | 6/2012 | Badding et al. | |
| 2012/0171596 A1* | 7/2012 | Hilliard | C25B 9/10 |
| | | | 429/482 |
| 2015/0004506 A1* | 1/2015 | Tomita | H01M 8/04395 |
| | | | 429/430 |
| 2016/0208791 A1* | 7/2016 | Reeh | F04B 19/24 |

FOREIGN PATENT DOCUMENTS

| | | |
|---|---|---|
| JP | 5038578 B2 | 10/2012 |
| JP | 2012531713 A | 12/2012 |
| KR | 20040011416 A | 2/2004 |
| RU | 2422951 C1 | 6/2011 |
| WO | 0178170 A1 | 10/2001 |
| WO | 0211220 A1 | 2/2002 |
| WO | 03058748 A2 | 7/2003 |
| WO | 2010151613 A1 | 12/2010 |

OTHER PUBLICATIONS

Extended European Search Report dated Dec. 14, 2018 in EP Application No. 18200616.3.
Extended European Search Report dated Feb. 26, 2018 in EP Application No. 15831880.8.
Office Action dated Apr. 16, 2018 in JP Application No. 2017-507746.
Int'l Search Report dated Jan. 28, 2016 in Int'l Application No. PCT/US2015/044435.
Int'l Preliminary Report on Patentability dated Feb. 14, 2017 in Int'l Application No. PCT/US2015/044435.
Written Opinion dated Jan. 28, 2016 in Int'l Application No. PCT/US2015/044435.
Office Action dated Feb. 25, 2019 in KR Application No. 10-2017-7006589.
Office Action dated Jan. 3, 2109 in CN Application No. 2015800434450.
Gellender, M., "A proposed new energy source: The "mixing energy" of engine exhaust gas," Journal of Renewable and Sustainable Energy, vol. 2, pp. 023101-1-023101-14 (2010).
Joshi, Dr. Ashok V., "Thermoelectric Conversion with Ion Conductors," Final Report, Contract #N00014-86-C-0827, 40 pages (Jan. 1990).
Virkar et al., "Theoretical Assessment of an Oxygen Heat Engine: The Effect of Mass Transport Limitation," Energy Convers. Mgmt., vol. 32, No. 4, pp. 359-370 (1991).

* cited by examiner

— P Ratio = 10    ---- P Ratio = 100    ---- P Ratio = 1000
--- P Ratio = 10000  -·- P Ratio = 100000 -···- P Ratio = 1000000

THERMO-ELECTROCHEMICAL CONVERTER

CROSS-REFERENCE TO RELATED APPLICATION

This application is a Section 371 of International Application No. PCT/US2015/044435, filed Aug. 10, 2015, which was published in the English language on Feb. 18, 2016, under International Publication No. WO 2016/025372 A1, and which claims priority to U.S. Patent Application No. 62/035,560, filed Aug. 11, 2014, the disclosures of both of which are incorporated herein by reference in their entireties.

BACKGROUND OF THE INVENTION

The conversion of heat energy or chemical energy to electrical energy, or visa-versa, may be accomplished in a variety of ways. For example, known electrochemical cells or batteries rely on chemical reactions wherein ions and electrons of a reactant being oxidized are transferred to the reactant being reduced via separate paths. Specifically, the electrons are transferred electrically via wiring through an external load where they perform work and the ions are conducted through an electrolyte separator.

However, battery type electrochemical cells can produce only a limited amount of energy because the confines of the battery casing limit the amount of available reactants that may be contained therein. Although such cells can be designed to be recharged by applying a reverse polarity current/voltage across the electrodes, such recharging requires a separate electrical source. Also, during the recharging process, the cell is typically not usable.

Fuel cells have been developed in an effort to overcome problems associated with battery type electrochemical cells. In conventional fuel cells, the chemical reactants are continuously supplied to and removed from the electrochemical cell. In a manner similar to batteries, fuel cells operate by conducting an ionized species through a selective electrolyte which generally blocks passage of electrons and non-ionized species.

The most common type of fuel cell is a hydrogen-oxygen fuel cell which passes hydrogen through one of the electrodes and oxygen through the other electrode. The hydrogen ions are conducted through the electrolyte separator to the oxygen side of the cell under the chemical reaction potential of the hydrogen and oxygen. Porous electrodes on either side of the electrolyte separator are used to couple the electrons involved in the chemical reaction to an external load via an external circuit. The electrons and hydrogen ions reconstitute hydrogen and complete the reaction, while the oxygen on the oxygen side of the cell results in the production of water which is expelled from the system. A continuous electrical current is maintained by a continuous supply of hydrogen and oxygen to the cell.

Mechanical heat engines have also been designed and used to produce electrical power. Such mechanical heat engines operate on thermodynamic cycles wherein shaft work is performed using a piston or turbine to compress a working fluid. The compression process is performed at a low temperature and, after compression, the working fluid is raised to a higher temperature. At the high temperature, the working fluid is allowed to expand against a load, such as a piston or turbine, thereby producing shaft work. A key to the operation of all engines employing a working fluid is that less work is required to compress the working fluid at low temperatures than that produced by expanding it at high temperatures. This is the case for all thermodynamic engines employing a working fluid.

For example, steam engines operate on the Rankine thermodynamic cycle, wherein water is pumped to a high pressure, and then heated to steam and expanded through a piston or turbine to perform work. Internal combustion engines operate on the Otto cycle, wherein low-temperature ambient air is compressed by a piston and then heated to very high temperatures via fuel combustion inside the cylinder. As the cycle continues, the expansion of the heated air against the piston produces more work than that consumed during the lower temperature compression process.

The Stirling engine has been developed to operate on the Stirling cycle in an effort to provide an engine that has high efficiency and offers greater versatility in the selection of the heat source. The ideal Stirling thermodynamic cycle is of equivalent efficiency to the ideal Carnot cycle, which defines the theoretical maximum efficiency of an engine operating on heat input at high temperatures and heat rejection at low temperatures. However, as with all mechanical engines, the Stirling engine suffers from reliability problems and efficiency losses associated with its mechanical moving parts.

In an effort to avoid the problems inherent with mechanical heat engines, Alkali Metal Thermo-Electrochemical Conversion (AMTEC) cells have been designed as a thermo-electrochemical heat engine. AMTEC heat engines utilize pressure to generate a voltage potential and electrical current by forcing an ionizable working fluid, such as sodium, through an electrochemical cell at high temperatures. The electrodes couple the electrical current to an external load. Electrical work is performed as the pressure differential across the electrolyte separator forces molten sodium atoms through the electrolyte. The sodium is ionized upon entering the electrolyte, thereby releasing electrons to the external circuit. On the other side of the electrolyte, the sodium ions recombine with the electrons to reconstitute sodium upon leaving the electrolyte, in much the same way as the process that occurs in battery and fuel cell type electrochemical cells. The reconstituted sodium, which is at a low pressure and a high temperature, leaves the electrochemical cell as an expanded gas. The gas is then cooled and condensed back to a liquid state. The resulting low-temperature liquid is then re-pressurized. Operation of an AMTEC engine approximates the Rankine thermodynamic cycle.

Numerous publications are available on AMTEC technology. See, for example, *Conceptual design of AMTEC demonstrative system for 100 t/d garbage disposal power generating facility*, Qiuya Ni et al. (Chinese Academy of Sciences, Inst. of Electrical Engineering, Beijing, China). Another representative publication is *Intersociety Energy Conversion Engineering Conference and Exhibit* (IECEC), 35th, Las Vegas, Nev. (Jul. 24-28, 2000), Collection of Technical Papers. Vol. 2 (A00-37701 10-44). Also see American Institute of Aeronautics and Astronautics, 190, p. 1295-1299. REPORT NUMBER(S)— AIAA Paper 2000-3032.

AMTEC heat engines suffer from reliability issues due to the highly corrosive nature of the alkali metal working fluid. AMTEC engines also have very limited utility. Specifically, AMTEC engines can only be operated at very high temperatures because ionic conductive solid electrolytes achieve practical conductivity levels only at high temperatures. Indeed, even the low-temperature pressurization process must occur at a relatively high temperature, because the alkali metal working fluid must remain above its melt temperature at all times as it moves through the cycle.

Mechanical pumps and even magneto-hydrodynamic pumps have been used to pressurize the low-temperature working fluid.

In an effort to overcome the above-described drawbacks of conventional mechanical and thermo-electrochemical heat engines, the Johnson Thermo-Electrochemical Converter (JTEC) system (disclosed in U.S. Pat. No. 7,160,639 filed Apr. 28, 2003) was developed. Referring to FIG. 2, there is shown a typical JTEC system (electrical connections not shown). JTEC is a heat engine that includes a first electrochemical cell 100 operating at a relatively low temperature, a second electrochemical cell 110 operating at a relatively high temperature, a conduit system 112 including a heat exchanger 114 that couples the two cells together, and a supply of ionizable gas (such as hydrogen or oxygen) as a working fluid contained within the conduit system. Each electrochemical cell includes a Membrane Electrode Assembly (MEA).

More particularly, the JTEC heat engine includes a first MEA stack 118 coupled to a high temperature heat source $Q_H$ (i.e., a high temperature MEA), a second MEA stack 116 coupled to a low temperature heat sink $Q_L$ (i.e., a low temperature MEA), and a recuperative heat exchanger 114 connecting the two MEA stacks 116, 118. Each MEA stack 116, 118 includes a non-porous membrane 120 capable of conducting ions of the working fluid and porous electrodes 122 positioned on opposite sides of the non-porous membrane 120 that are capable of conducting electrons.

MEAs have been used in the fuel cell community to generate power via electrochemical reactions involving a fuel and an oxidizer, such as hydrogen and oxygen. However, the MEA stacks in conventional fuel cell applications require bidirectional flow in at least one of the electrodes. For example, oxygen flow into the cathode side of hydrogen-oxygen fuel cells must be maintained as the same time that the hydrogen-oxygen reaction product, water, is exiting. As such, large flow cross-sections for fuel and the oxidizer/reaction product must be an inherent feature of the design of conventional MEA stacks for fuel cells.

No such bidirectional flow is required in the JTEC. Specifically, during operation of the JTEC, the working fluid passes through each MEA stack 116, 118 by releasing an electron to the electrode 122 on the entering side, such that the ion can be conducted through the membrane 120 to the opposite electrode 122. The working fluid is reconstituted within the opposite electrode 122 as it re-supplies electrons to working fluid ions as they exit the membrane 120. The low temperature MEA stack 116 operates at a lower voltage than the high temperature MEA stack 118. The low temperature MEA stack 116 compresses the working fluid at low voltage and the high temperature MEA stack 118 expands hydrogen at high voltage. The difference in voltage between the two MEA stacks 116, 118 is applied across the external load. The hydrogen circulates continuously inside the JTEC heat engine and is never consumed. The current flow through the two MEA stacks 116, 118 and the external load is the same.

Specifically, in the JTEC heat engine, a hydrogen pressure differential is applied across each MEA stack 116, 118 with a load attached, thereby producing a voltage and current as hydrogen passes from high pressure to low pressure. The electron current is directed to the external load as electrons are stripped from the protons as they pass through the membrane 120, which is a proton conductive membrane (PCM). The JTEC system utilizes the electrochemical potential of hydrogen pressure applied across the PCM 120. More particularly, on the high pressure side of MEA stack 116 and the low pressure side of MEA stack 118, hydrogen gas is oxidized resulting in the creation of protons and electrons. The pressure differential at the high temperature end forces the protons through the membrane 120 causing the electrodes 122 to conduct electrons through an external load, while the imposition of an external voltage forces protons through the membrane at the low temperature end. On the high pressure side of MEA stack 116 and the low pressure side of MEA stack 118, the protons are reduced with the electrons to reform hydrogen gas.

Unlike conventional fuel cells, in which the hydrogen exiting the MEA stack would encounter oxygen and react with it producing water, there is no oxygen or water in the JTEC system. This process can also operate in reverse. Specifically, if current is passed through the MEA stack 116, a low-pressure gas can be "pumped" to a higher pressure. The reverse process is rather similar to that of using a MEA stack to electrolyze water, wherein water molecules are split and protons are conducted through the PCM, leaving oxygen behind on the water side. Hydrogen is often supplied at a high pressure to a pure hydrogen reservoir via this process.

In the JTEC, using hydrogen as the ionizable gas (i.e., the working fluid), the electrical potential due to a hydrogen pressure differential across the PCM 120 is proportional to the natural logarithm of the pressure ratio, and can be calculated using the Nernst equation:

$$V_{OC} = \frac{RT}{2F} \ln\left(\frac{P_H}{P_L}\right), \quad \text{Equation 1}$$

where $V_{OC}$ is open circuit voltage, R is the universal gas constant, T is the cell temperature, F is Faraday's constant, $P_H$ is the pressure on the high pressure side, $P_L$ is the pressure on the low pressure side, and $P_H/P_L$ is the pressure ratio. E.g., Fuel Cell Handbook, J. H. Hirschenhofer et al., 4$^{th}$ Edition, p. 2-5 (1999).

The voltage generated by the MEA stack 116 is thus given by the Nernst equation. The voltage is linear with respect to temperature and is a logarithmic function of the pressure ratio. FIG. 1 is a plot of the Nernst equation for hydrogen and shows the voltage vs. temperature relationship for several pressure ratios. For example, referring to FIG. 1, at a pressure ratio of 10,000, when the temperature is relatively high, the voltage is similarly relatively high and when the temperature is relatively low, the voltage is similarly relatively low.

The working fluid in the JTEC is compressed in the low temperature electrochemical cell 100 by supplying current at a voltage that is sufficient to overcome the Nernst potential of the low temperature cell 100, thereby driving hydrogen from the low pressure side of the membrane 120 to the high pressure side. On the other hand, the working fluid is expanded in the high temperature electrochemical cell 110 as current (power) is extracted under the Nernst potential of the high temperature cell 110. Electrical current flow is generated as hydrogen expands from the high pressure side of the membrane 120 to the low pressure side. As in any thermodynamic engine employing a working fluid and consistent with the nature of compressible gas, in the JTEC, a greater amount of work (electricity) is extracted during high temperature expansion than the work (electricity) input required for the low temperature compression. The difference in heat energy input to the engine to maintain constant temperature during high temperature expansion versus the heat energy removed to maintain constant temperature during low temperature compression is provided as the difference in electrical energy output by the high temperature expansion process versus that consumed by the low temperature compression process.

Consistent with the Nernst equation, the high temperature cell 110 will have a higher voltage than the low temperature cell. Since the current (I) is the same through both cells 100, 110, the voltage differential means that the power generated through the expansion of hydrogen in the high temperature cell 110 is higher than that of the low temperature cell 100. The power output by the high temperature cell ($V_{HT}$*I) is sufficient to drive the compression process in the low temperature cell 100 ($V_{LT}$*I) as well as supply net power output to an external load (($V_{HT}$*I)−(VLT*I)). This voltage differential provides the basis for the JTEC engine.

Operation of the JTEC is generally similar to any other engine. For example, in a typical jet engine, the compressor stage pulls in air, compresses the air, and supplies the compressed air to the combustion chamber. The air is then heated in the combustion chamber and expands through the power stage. The power stage couples shaft work back to the compressor stage, in order to maintain a continuous supply of compressed air. The difference in work generated by the power stage and that consumed by the compressor stage is the net work output by the engine. However, the primary difference between such conventional engines and the JTEC is that such conventional engines utilize a turbine (i.e., a mechanical device) and operate on the Brayton thermodynamic cycle, whereas the JTEC is an all solid-state engine that operates on the more efficient Ericsson cycle, which is equivalent to the Carnot cycle.

Referring to FIG. 3, there is shown the ideal temperature entropy diagram for the Ericsson engine cycle of the JTEC. Reference numerals "1" through "4" in FIGS. 2-3 represent different thermodynamic states. The thermodynamic states 1 through 4 are identical at the respective identified points in FIGS. 2 and 3. As shown in FIG. 2, beginning at the low-temperature, low-pressure state 1, electrical energy $W_{in}$ is supplied to the low-temperature MEA stack in order to pump hydrogen from the low-temperature, low-pressure state 1 to the low-temperature, high-pressure state 2. The temperature of the hydrogen is maintained nearly constant by removing heat $Q_L$ from the PCM 120 during the compression process. The membrane 120 is relatively thin (i.e., less than 10 μm thick), and thus will not support a significant temperature gradient, so the near isothermal assumption for the process is valid, provided adequate heat is transferred from the membrane 120 through its substrate.

From state 2, the hydrogen passes through the recuperative, counterflow heat exchanger 114 and is heated under approximately constant pressure to the high-temperature state 3. The heat needed to elevate the temperature of the hydrogen from state 2 to 3 is transferred from hydrogen flowing in the opposite direction through the heat exchanger 114. At the high-temperature, high-pressure state 3, electrical power is generated as hydrogen expands across the MEA stack 118 from the high-pressure, high-temperature state 3 to the low-pressure, high-temperature state 4. Heat $Q_H$ is supplied to the thin film membrane 120 to maintain a near constant temperature as the hydrogen expands from high-pressure state 3 to low-pressure state 4. From state 4 to state 1, the hydrogen flows through the recuperative heat exchanger 114, wherein its temperature is lowered by heat transfer to hydrogen passing from state 2 to 3. The hydrogen is pumped by the low-temperature MEA stack 100 from state 1 back to high-pressure state 2 as the cycle continues.

However, some challenges have been encountered with developing a JTEC that is suitable for widespread use, particularly for systems that use hydrogen as the working fluid. For example, hydrogen leakage through small defects in the conduit system may occur due to the small size of the hydrogen molecule. In particular, hydrogen leakage can occur at the joints of the interconnects for the conduit couplings between the high-temperature cell and the low-temperature cell.

The engine design is also complicated by the need for a large membrane/electrode surface area and by the need for a significant number of cells to be electrically connected in series to achieve practical output voltage levels. Specifically, unlike conventional fuel cells, where the open circuit voltage can be greater than 1V, the Nernst voltage from the hydrogen pressure differential across a MEA stack is in the range of only about 0.2 Volts. As such, many cells will have to be connected in series to achieve useful output voltage levels.

Further, in order to achieve efficient energy conversion, the membranes must have high diffusion barrier properties, because diffusion of working fluid (such as hydrogen gas) under the pressure differential across the membrane results in reduced electrical output and efficiency. The membranes utilized must also have good ion conductivity. However, known and available membrane materials that have good ion conductivity, such as Nafion manufactured by the DuPont Corp., generally have very poor molecular diffusion barrier properties. Conversely, known and available membrane materials that have high molecular diffusion barrier properties generally have relatively low ionic conductivity, and use of such materials would result is high system impedance and high polarization losses. As such, large membrane areas are needed in order to keep current density at a minimum so as to minimize resistive polarization losses. However, the cell will have low internal impedance if the ion conduction cross-sectional area of the membrane is too large.

Accordingly, there is a need for a practical way of using available high barrier, low conductivity membrane materials to provide a thermo-electrochemical heat engine that can approximate a Carnot equivalent cycle, that can operate over a wide range of heat source temperatures, and that eliminates the reliability and inefficiency problems associated with mechanical engines. The solid state heat engine of the present invention fulfills this need.

BRIEF SUMMARY OF THE INVENTION

One embodiment of the present invention relates to a co-sintered or fused, high density MEA stack or electrochemical cell configured to electrochemically expand or compress an ionizable working fluid. The MEA stack is a multi-layered structure of alternating thin electrodes and membranes. The membranes are preferably non-porous and conductive of ions of the working fluid. The membranes are a high diffusion barrier to the working fluid that has not been ionized. The electrodes are preferably porous and include additives to promote electronic conductivity and a catalyst to promote the desired electrochemical reactions.

In one embodiment, the MEA stack is preferably made of ceramic materials and has a co-sintered structure. In another embodiment, the MEA stack is preferably made of polymeric materials and has a fused structure. Co-sintering or fusing of the components of the MEA stack allows for a practical construction of a large membrane area within a relatively small volume, while avoiding the complications and challenges associated with construction of individual cells and then making individual interconnects including flow manifolds, seals and electrical connections. The electrochemical cells or MEA stacks of the present invention also preferably operate on pressure differentials.

I have also surprisingly discovered that in-plane flow of the working fluid within thin electrodes enables construction of MEA stacks having high energy conversion density. This is unexpected, considering that existing fuel cell art teaches against in-plane flow of reaction fluids within thin electrodes. Specifically, existing fuel cell art teaches that electrodes should be thin, but that flow through the electrode should be perpendicular to the ion conductive membrane (i.e., not in-plane), in order to minimize concentration polarization effects.

In operation, working fluid enters an MEA stack through one of the porous electrodes and releases electrons to that electrode as its ions enter and are conducted through the membrane. The electrons are routed through an external circuit to the other electrode on the opposite side of the membrane. The ions are conducted through the membrane and exit the electrode on the opposite side. The working fluid is reconstituted as its ions exit the membrane and recombine with the electrons. The thin electrodes and membranes are stacked at high density in alternating sequence with each other, such that adjacent MEA stacks share a common electrode. More particularly, the high density MEA stacks of the present invention are preferably configured such that each membrane is sandwiched by a pair of electrodes, with one of the electrodes of the pair being positioned on the high pressure side of the membrane and the other electrode of the pair being positioned on the low pressure side of the membrane.

In another embodiment, the present invention relates to a thermo-electrochemical converter, preferably configured as a JTEC, direct heat to electricity engine having a monolithic co-sintered ceramic structure or a monolithic fused polymeric structure. The co-sintered ceramic structure or fused polymeric structure preferably includes a heat exchanger and first and second high density MEA stacks of the structure described above. The heat engine further contains an ionizable working fluid that circulates within a continuous flow loop between the two high density MEA stacks within a system of high and low pressure conduits.

The first high density MEA stack is preferably connected to a heat source and functions to expand the working fluid from a high pressure to a low pressure. The expansion of the working fluid through the first MEA stack generates electricity. The second high density MEA stack is preferably connected to a heat sink and functions to pump the working fluid from a low pressure to a high pressure. Electrical power is consumed by the compression process and the heat of compression is rejected.

The co-sintered or fused heat engine preferably further comprises a conduit system including at least one high pressure flow channel, and more preferably a plurality of high pressure flow channels, which couple the flow of the working fluid between high pressure electrodes of the first high density MEA stack to high pressure electrodes of the second high density MEA stack, such that the connected high pressure electrodes are essentially at the same pressure. The conduit system preferably further includes at least one low pressure flow channel, and more preferably a plurality of low pressure flow channels, which couple the flow of the working fluid between the low pressure electrodes of the first high density MEA stack to the low pressure electrodes of the second high density MEA stack, such that the connected low pressure electrodes are essentially at the same pressure. The high pressure electrodes within each high density MEA stack are preferably electrically connected to each other. Similarly, the low pressure electrodes within each high density MEA stack are preferably electrically connected to each other. As such, the electrically connected high density MEA stacks function as a single membrane electrode assembly having a large area and a Nernst voltage that is a function of the stacks' temperature and the pressure differential across the membranes.

In one embodiment, sections of the high pressure channels and sections of the low pressure channels are preferably in physical contact with each other, and thus have a high interface area and thermal conductivity so as to facilitate effective heat transfer between working fluid in a high pressure channel and working fluid in a low pressure channel.

The heat exchanger of the co-sintered or fused heat engine preferably functions as a recuperative heat exchanger to recuperate heat from working fluid leaving the high temperature MEA stack by coupling it to working fluid flowing to the high temperature MEA stack. Providing such a recuperative heat exchanger in combination with a heat source and heat sink coupled to the high and low temperature electrochemical cells (i.e., MEA stacks) enables sufficient heat transfer for near constant temperature expansion and compression processes, thereby allowing the engine to approximate the thermodynamic Ericsson cycle.

In one embodiment, wherein the MEA stacks operate as part of an engine, the heat source to which the first MEA stack is coupled is preferably at an elevated temperature relative to the temperature of the heat sink to which the second MEA stack is coupled. As such, the higher temperature MEA stack (i.e., the first MEA stack) has a higher Nernst voltage than the lower temperature stack (i.e., the second MEA stack). The voltage generated by the high temperature MEA stack is high enough to overcome the Nernst voltage of the low temperature MEA stack and have sufficient voltage left over to power an external load connected in series.

In another embodiment, in which the MEA stacks operate as part of a heat pump application, the first MEA stack is preferably coupled to a heat source that is at a reduced temperature and the second MEA stack is preferably coupled to a heat sink that is at an elevated temperature relative to the heat source of the first MEA stack. Working fluid is expanded at a low temperature in the first MEA stack as the heat of expansion is extracted from the low temperature heat source. Working fluid is compressed at a high temperature in the second MEA stack, and the heat of compression is rejected at the elevated temperature. Because of the low temperature of the first MEA stack, the first MEA stack produces a Nernst voltage that is less than that of the high temperature MEA stack. An external power source is connected in series with the low temperature MEA stack in order to provide a combined voltage that is high enough to overcome the Nernst potential of the high temperature MEA stack and thereby drive the compression process therein.

BRIEF DESCRIPTION OF THE SEVERAL VIEWS OF THE DRAWINGS

The following detailed description of preferred embodiments of the present invention will be better understood when read in conjunction with the appended drawing. For the purposes of illustrating the invention, there is shown in the drawing an embodiment which is presently preferred. It is understood, however, that the invention is not limited to the precise arrangements and instrumentalities shown. In the drawings.

DETAILED DESCRIPTION OF THE INVENTION

Figure 1:
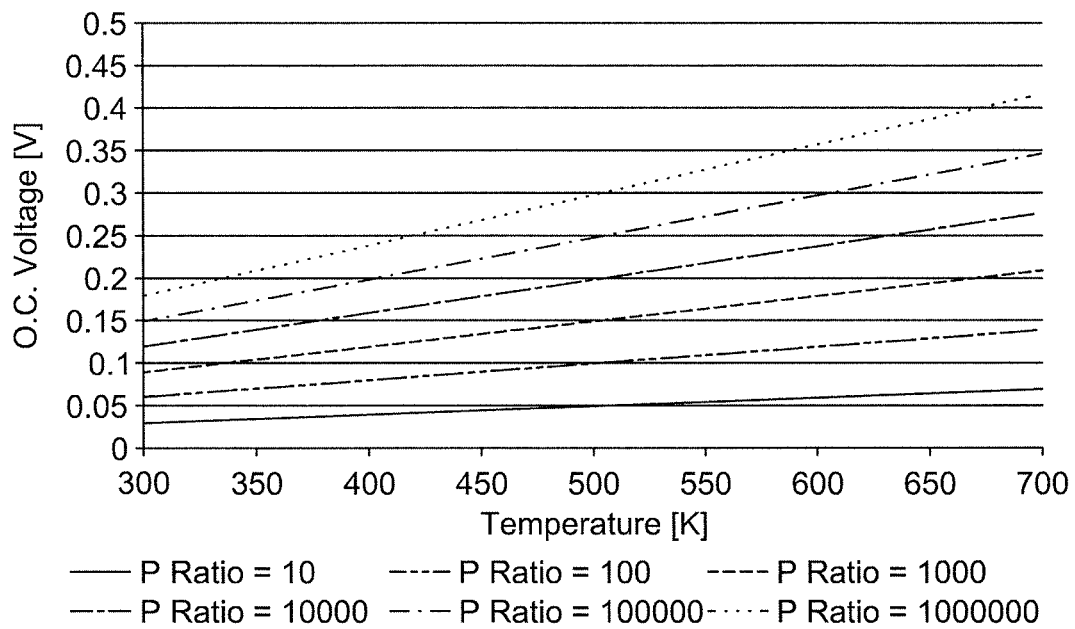
FIG. 1 is a plot of Nernst voltage versus temperature for several pressure ratios.
Figure 3:
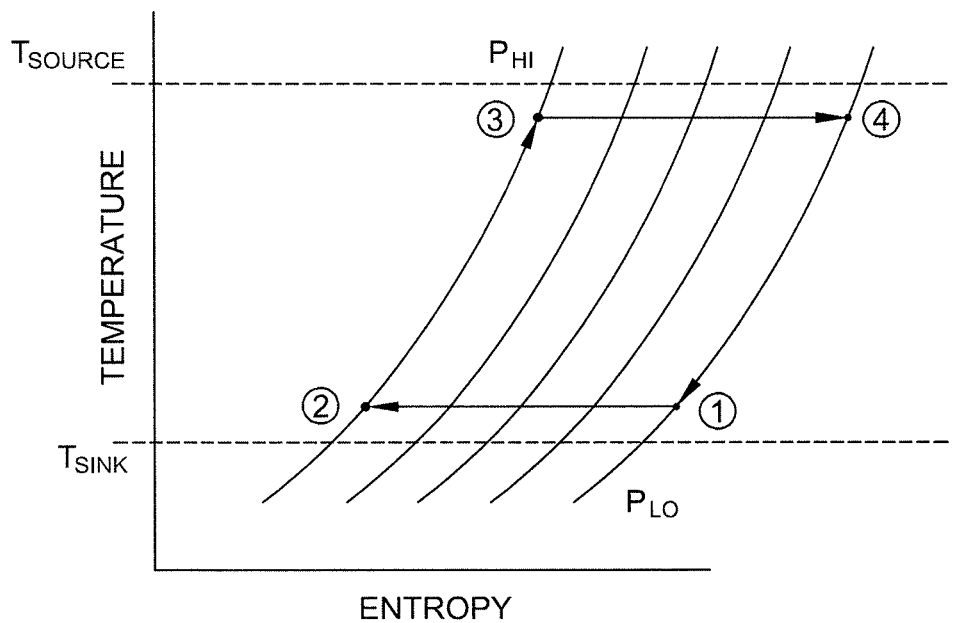
FIG. 3 is a diagram of the Ericsson thermodynamic cycle.
Figure 2:
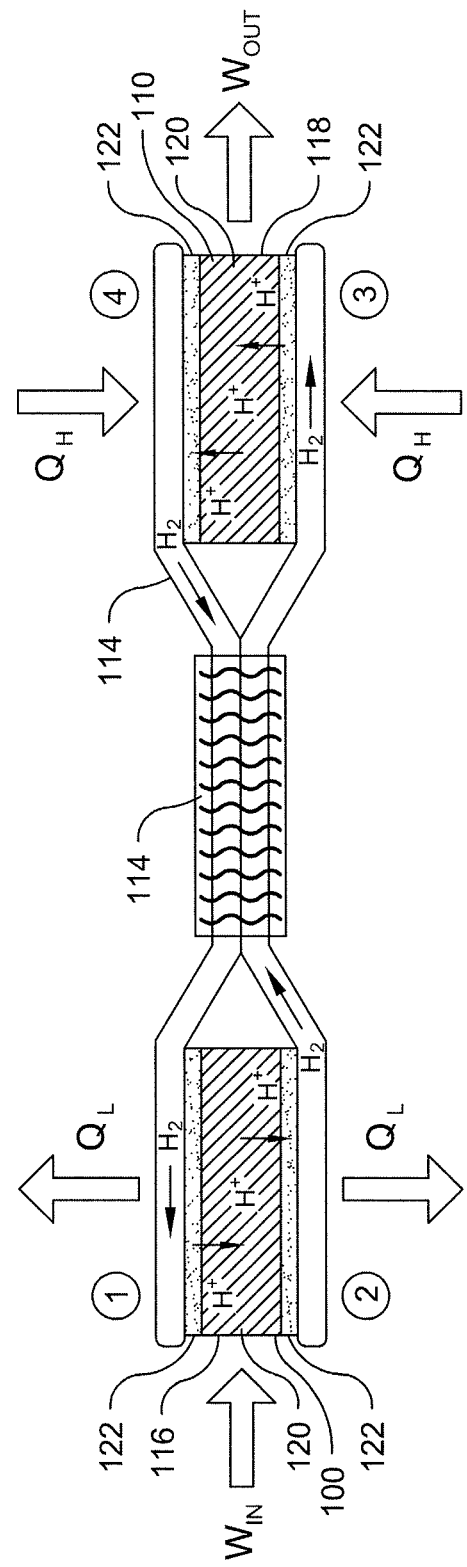
FIG. 2 is a diagram of a Johnson Thermo-Electrochemical Converter including two membrane electrode assemblies connected back to back by a recuperative heat exchanger.

Certain terminology is used in the following description for convenience only and is not limiting. The words "proximal," "distal," "upward," "downward," "bottom" and "top" designate directions in the drawings to which reference is made. The words "inwardly" and "outwardly" refer to directions toward and away from, respectively, a geometric center of the device, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

It will also be understood that terms such as "first," "second," and the like are provided only for purposes of clarity. The elements or components identified by these terms, and the operations thereof, may easily be switched.

Referring to the drawings in detail, wherein like numerals indicate like elements throughout the several views, FIGS. 4-9 show preferred embodiments of a high density co-sintered MEA stack 10. The terms "electrochemical cell," "membrane electrode assembly stack," "MEA stack," and "stack" are used interchangeably herein.

In one embodiment, where components of the high density MEA stack are made of ceramic materials, the MEA stack 10, and more particularly each of the flat components of the stack 10 (as described in detail hereinafter), is produced by co-sintering. Co-sintering is a known, low cost procedure for shaping ceramic materials, and more particularly for the fabrication of thin (i.e., from 20 µm up to 500 µm) flat components. Co-sintering technology can be used to produce a wide variety of controlled morphologies, from highly porous to fully dense microstructures. The co-sintering process is well known to those skilled in the art.

Generally, starting powders of different natures, and more particularly starting ceramic powders, are incorporated and mixed together with an aqueous medium to form a slurry, and the slurry is then cast into green tapes using a tape casting method. Tape casting also allows for stacking the cast green tapes to obtain a multilayered final product (i.e., the MEA stack 10). More particularly, multiple coating layers of green ceramic material may be cast or screen printed onto each other to form a layered structure which is ultimately sintered to form a MEA stack.

For a given powder, the sintering behavior of the cast green tapes, and hence the final microstructure of the sintered layers, depends on the arrangement and particle sizes, dispersion and homogeneity of the starting ceramic powder particles in the slurry. Consequently, the slurry formulation is a very important step in the shaping process.

Preferably, the slurry is composed of a mixture of several organic and inorganic compounds. The organic components preferably include a binder, a dispersant, a plasticizer, and, in the case of organic tape casting, a solvent. Other additives, such as wetting agents, defoamers, and pore formers (if porosity is desired in the final microstructure) may also be used to form the slurry. The inorganic compounds include the ceramic powders to be shaped, sintering additives, and water as the medium/solvent for the aqueous tape casting. An example of a ceramic powder for formation of a high temperature MEA stack (as discussed in more detail hereinafter) 10 is yttrium doped barium cerate (Y:BaCeO$_3$). An example of ceramic powder for formation of a low temperature MEA stack (as discussed in more detail hereinafter) 10 is a composite of 95% LiH$_2$PO$_4$ with 5% H$_3$PO$_4$.

After casting, the stacked cast tapes are allowed to dry. The tapes may be allowed to air dry for a predetermined period of time or may be passed through a drier to accelerate drying. Select organic components may remain in the green tapes after drying. The tapes are then heated to elevated temperatures to effect sintering of the cast green tapes. The organic components which remained after drying are sacrificial materials that are removed when the tapes are heated for sintering. As such, the remaining organic components give rise to pores and flow passages which remain during the subsequent sintering treatment. The sintered layers of the MEA stack 10 are thus formed.

In another embodiment, where components of the high density MEA stack are made of polymeric materials, the MEA stack 10, and more particularly each of the flat components of the stack 10 (as described in detail hereinafter), is produced by a fusing process. The various types of fusing processes are well known to those skilled in the art. For example, in one type of the fusing process, the polymeric materials may be softened using a solvent and/or glued together using a polymer/solvent solution. In another type of fusing process, the polymeric components may be assembled together in a series of hot pressing steps wherein a layer is added and hot pressed in place with each step.

Figure 4:
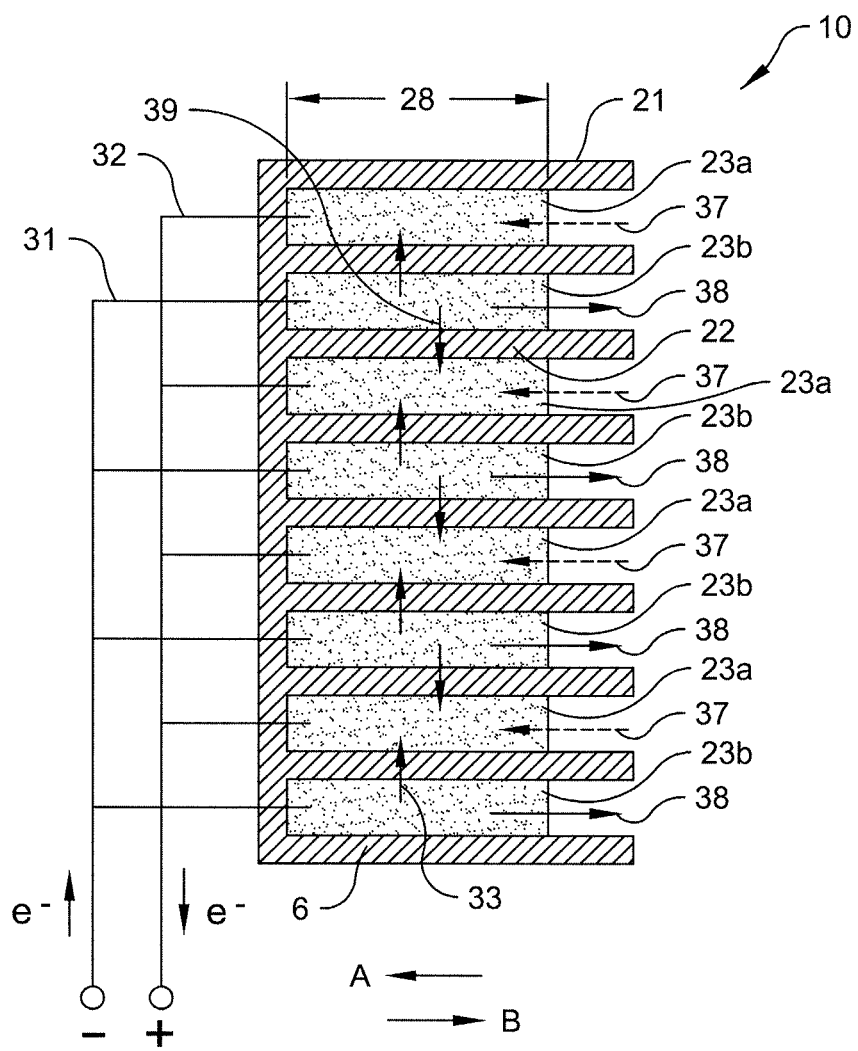
FIG. 4 is a schematic of a high density co-sintered or fused membrane electrode assembly stack in accordance with an embodiment of the present invention.

Referring to FIG. 4, there is shown the internal configuration 6 of a high density monolithic MEA stack 10 in accordance with a preferred embodiment of the present invention. The MEA stack 10 comprises overlapping layers of alternating electrodes 23 and membranes 22 arranged in a high density stacked configuration. That is, each membrane 22 is sandwiched between a pair of electrodes 23, such that the electrodes 23 are stacked in alternating sequence with the membranes 22, thus forming MEA stacks 10 through which a working fluid, preferably hydrogen, can pass by undergoing an electrochemical oxidation/reduction process.

The membranes 22 are preferably ion conductive membranes or proton conductive membranes having a thickness on the order of approximately 0.1 µm to 500 µm, and more preferably between approximately 1 µm and 500 µm. More particularly, the membranes 22 are preferably made from a proton conductive material, and more preferably a polymer proton conductive material or a ceramic proton conductive material. In one embodiment, the membranes 22 are preferably formed of a material comprising a compound represented by the general formula $Na_xAl_yTi^{3+}_{x-y}Ti^{4+}_{8-x}O_{16}$, as disclosed in U.S. Pat. No. 4,927,793 of Hori et al., which is incorporated herein by reference, since this material exhibits high proton conductivity over a broad temperature range. However, it will be understood by those skilled in the art that any material, and preferably any polymer or ceramic material, which demonstrates a similar proton conductivity over a broad temperature range may be used to form the membranes 22. For example, in an alternate embodiment, the membranes 22 are formed of hydronium beta" alumina. The polymer or ceramic membrane material 22 preferably forms a high barrier to molecular working fluid flow and provides for effective containment of the working fluid.

The electrodes 23 are preferably thin electrodes having a thickness on the order of approximately 10 μm to 1 cm, and more preferably approximately 50 μm to 1,000 μm. The use of different materials for the various components (i.e., the electrodes 23 and the membranes 22) could result in very high thermal stresses due to differences in the thermal expansion coefficients between the materials. Accordingly, the electrodes 23 are preferably comprised or formed of the same material as the membranes 22. However, the electrodes 23 are preferably porous structures, while the membranes 22 are preferably non-porous structures. Because the same basic material composition is preferably used for the electrodes 23 as for the bulk membrane 22 material structure, the high thermal stresses that would otherwise occur under the extreme temperatures encountered during co-sintering or fusing to form the MEA stacks 10 and in many end-use applications during operation of the MEA stacks 10 are eliminated or at least reduced. However, it will be understood that the electrodes 23 and the membranes 22 may be formed of different materials having similar thermal expansion coefficients, such that there would be little or no thermal stress generated during co-sintering/fusing or use of the MEA stack 10.

In one embodiment, the porous electrodes 23 may be doped or infused with additional material(s) to provide electronic conductivity and catalytic material, in order to promote oxidation and reduction of the working fluid.

The length 28 of the MEA stack 10 is preferably between approximately 0.25 cm and 10 cm. The width (depth into the drawing) of the MEA stack 10 is preferably between approximately 1 cm and 100 cm. However, it will be understood by those skilled in the art that the dimensions of the MEA stack 10 may vary and be selected as appropriate depending on the application in which the MEA stack 10 is to be used.

Given the low ion conductivity of known and available ceramic materials which may be used to form the membranes 22 and the low Nernst voltage levels generated at reasonable operating temperatures and pressures by these ceramic membrane materials, high membrane surface areas are desirable within the MEA stack 10. Resistive losses associated with high current density, as protons are conducted through the membranes, could otherwise represent a significant reduction in output voltage and thereby efficiency.

Accordingly, the MEA stack 10 has a high density of overlapping electrodes 23 and membranes 22, which yields a very high membrane to electrode interface area within a relatively small stack volume, with the ion conductive material of the membranes 22 comprising the bulk structure of the MEA stack 10. More particularly, the bulk area of the MEA stack 10 is occupied by a plurality of the membranes 22. It will be understood that the bulk area within a particular stack 10 will depend on the number of membrane 22 and electrode 23 layers, as well as the respective thicknesses of such layers, within a given unit of stack height. For example, a representative stack 10 having membranes 22 with a thickness of 20 μm sandwiched between 40 μm porous electrodes 23, will have a total membrane area of 166 cm² per cm³ of stack volume. In one embodiment, the plurality of membranes 22 are surrounded by an external housing 21, which may be made of the same or of a different material as the membranes 22.

The MEA stack 10 further comprises a conduit system including at least one low pressure conduit 37 (represented by dashed lines in FIG. 4) and at least one high pressure conduit 38 (represented by solid lines in FIG. 4). Preferably, the conduit system includes a plurality of low pressure conduits 37 and a plurality of high pressure conduits 38. A supply of an ionizable gas, preferably hydrogen, is contained within the conduit system as the working fluid.

The low pressure conduits 37 direct the flow of the working fluid (e.g., hydrogen) in the direction of arrow A, while the high pressure conduits 38 direct the flow of the working fluid in the direction of arrow B (i.e., the opposite direction of the low pressure conduits 37 flow). The low pressure conduits 37 and high pressure conduits 38 define low and high pressure sides of the MEA stack 10. The high pressure side of the MEA stack 10 may be at a pressure of as low as 0.5 psi and as high as 3,000 psi. Preferably, the high pressure side of the MEA stack 10 is maintained at a pressure of approximately 300 psi. The low pressure side of the MEA stack 10 may be at a pressure of as low as 0.0001 psi and as high as 0.3 psi. Preferably, the low pressure side of the MEA stack is maintained at a pressure of approximately 0.03 psi. A preferred pressure ratio of the high pressure side to the low pressure side is 10,000:1. The electrodes 23 in each MEA stack 10 are alternatingly coupled to the high pressure and low pressure conduits 38, 37, respectively, such that each membrane 22 is sandwiched between a first electrode 23 supplied by a high pressure conduit 38 and a second electrode 23 supplied by a low pressure conduit 37. Accordingly, each membrane 22 is preferably situated between a high pressure electrode 23b and a low pressure electrode 23a, such that each membrane 22 has a high pressure side and a low pressure side.

First and second terminals 31 and 32 are connected to the electrodes 23 of the MEA stack 10. Each terminal 31, 32 is preferably connected to the electrodes 23 in an alternating sequence, such that the high pressure electrodes 23 are connected to each other and to one of the terminals (e.g., the first terminal 31) and the low pressure electrodes 23a are connected to each other and to the other terminal (e.g., the second terminal 32).

In one embodiment, the MEA stack 10 may be configured to expand the working fluid from high pressure to low pressure so as to generate electricity. Still referring to FIG. 4, power may be extracted from the MEA stack 10 by connecting an electric load to the first and second terminals 31 and 32. Electric power is produced as the pressure differential between the high and low pressure conduits 38, 37 forces the working fluid through the MEA stack 10.

Referring to FIG. 1, using a preferred pressure ratio of 10,000:1, where the MEA stack 10 is a high temperature stack, operating at a temperature of 625K, the high temperature MEA stack 10 would have a Nernst voltage of approximately 250 mV. On the other hand, if one maintains operation of the MEA stack 10 at a relatively low temperature of 325K, the low temperature MEA stack 10 would have a Nernst voltage of approximately 125 mV. In this case, the open circuit voltage of the converter would be approximately 125 mV.

Referring again to FIG. 4, while under pressure, the working fluid is oxidized at the high pressure electrodes 23*b* connected to common second terminal 32, thereby releasing electrons to the electrodes 23*b* and causing ions of the working fluid to enter the ion/proton conductive membranes 22 as indicated by arrows 33. With the electrodes 23*b* connected to an external load, electrons flow through the load, through common first terminal 31 and then to the low pressure electrodes 23*a*, where ions/protons exiting the membranes 22 are reduced to reconstitute the working fluid. The converter supplies power to the external load as pressure forces the working fluid to flow through the MEA stack 10. In one embodiment, a heat source (not shown) may be coupled to the MEA stack 10 to supply heat of expansion to the working fluid so as to maintain a continuous and nearly isothermal expansion process.

In another embodiment, the MEA stack 10 is configured to operate to pump the working fluid from low pressure to high pressure creating a compression process. Electrical power is consumed by the compression process. A power source is applied across the first and second terminals 31 and 32. Voltage is applied at a potential that is sufficient to force current flow by overcoming the Nernst potential generated by the MEA stack 10 at its operating temperature and pressure differential. The applied power strips electrons from the working fluid at the interface of each low pressure electrode 23*a* and membrane 22. The resulting ions are conducted through the ion conductive membranes 22 in the direction indicated by arrows 39. The power source supplies electrons to the high pressure electrodes 23*b* via the first terminal 31, so as to reconstitute the working fluid at the interface of each high pressure electrode 23*b* and membrane 22 as ions exit the membrane 22. This current flow under the applied voltage, in effect, provides the pumping power needed for pumping the working fluid from low pressure to high pressure. In one embodiment, a heat sink (not shown) may be coupled to the MEA stack 10 to remove the resulting heat of compression, so as to maintain a continuous compression process.

Figure 5:
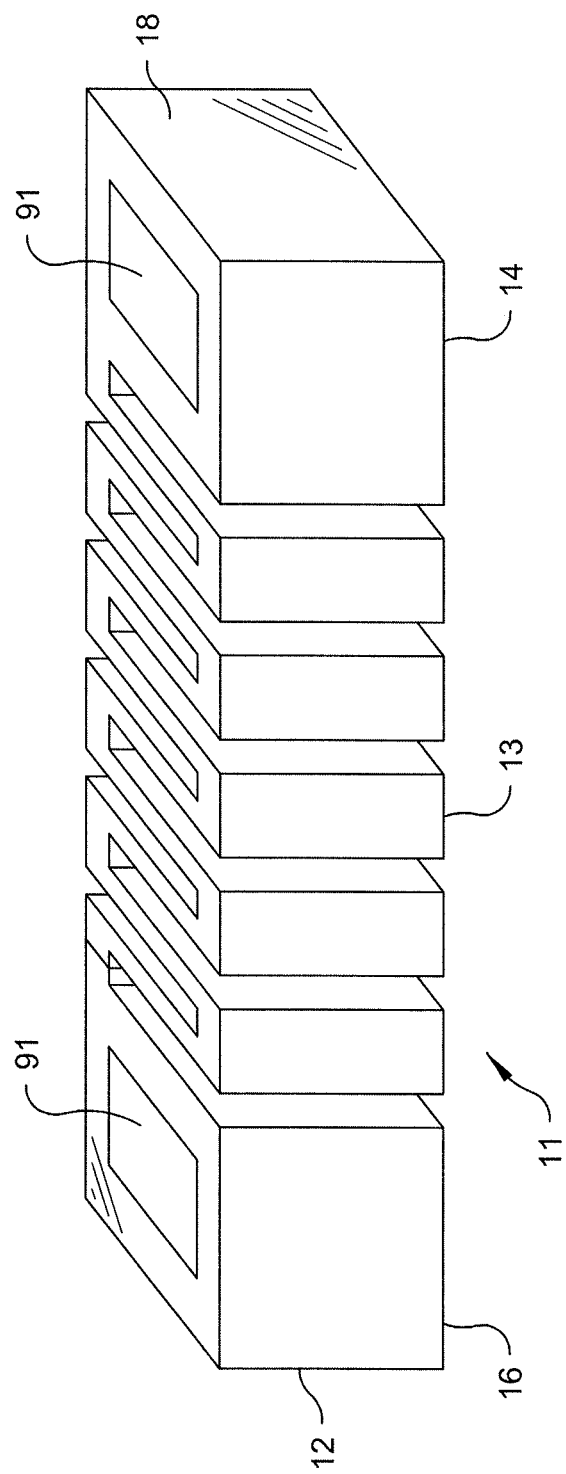
FIG. 5 is a schematic of a co-sintered or fused heat engine in accordance with an embodiment of the present invention.

Referring to FIG. 5, there is shown a co-sintered/fused high density direct heat to electricity converter or heat engine 11, and more particularly a monolithic JTEC 11, in accordance with a preferred embodiment of the present invention. The monolithic structure of the JTEC 11 includes a heat exchanger 13, a first high density MEA stack 14, and a second high density MEA stack 16. A first interface 12 is provided for connection of one of the MEA stacks 14, 16 to a heat sink (thereby forming a low temperature MEA stack) and a second interface 18 is provided for connection of the other one of the MEA stacks 14, 16 to a heat source (thereby forming a high temperature MEA stack). The first and second high density MEA stacks 14, 16 generally have the same configuration and structure as described above for the co-sintered MEA stack 10. However, it will be understood that the particular material employed as the membranes (i.e., ion conductors) in the high temperature stack may be different form that employed in the low temperature stack. For example, in one preferred embodiment, the high temperature MEA stack 14, 16 is formed of ceramic materials, while the low temperature MEA stack 14, 16 is formed of polymer materials.

Figure 6:
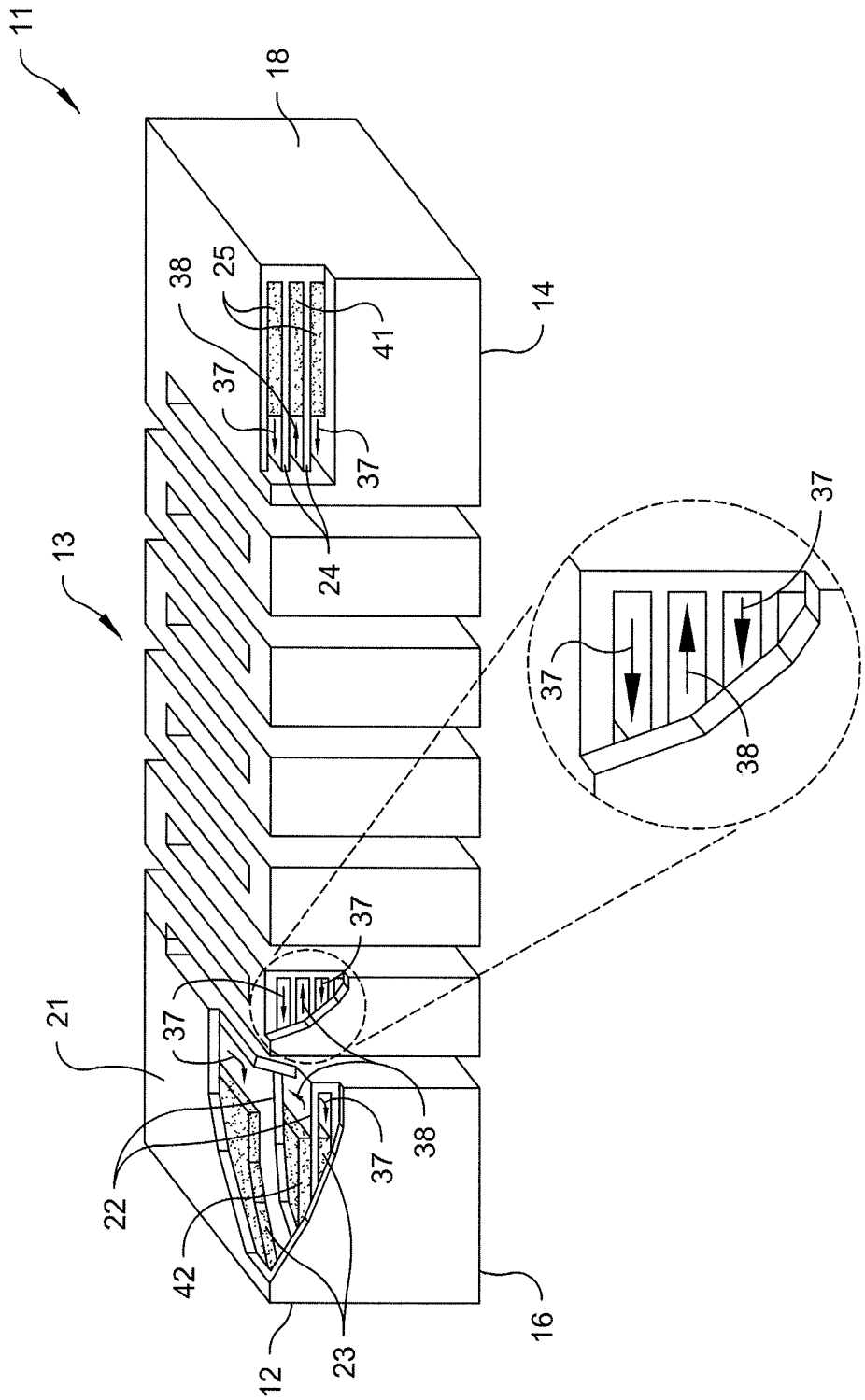
FIG. 6 is a partial cross-sectional view of the co-sintered or fused heat engine shown in FIG. 5.
Figure 7:
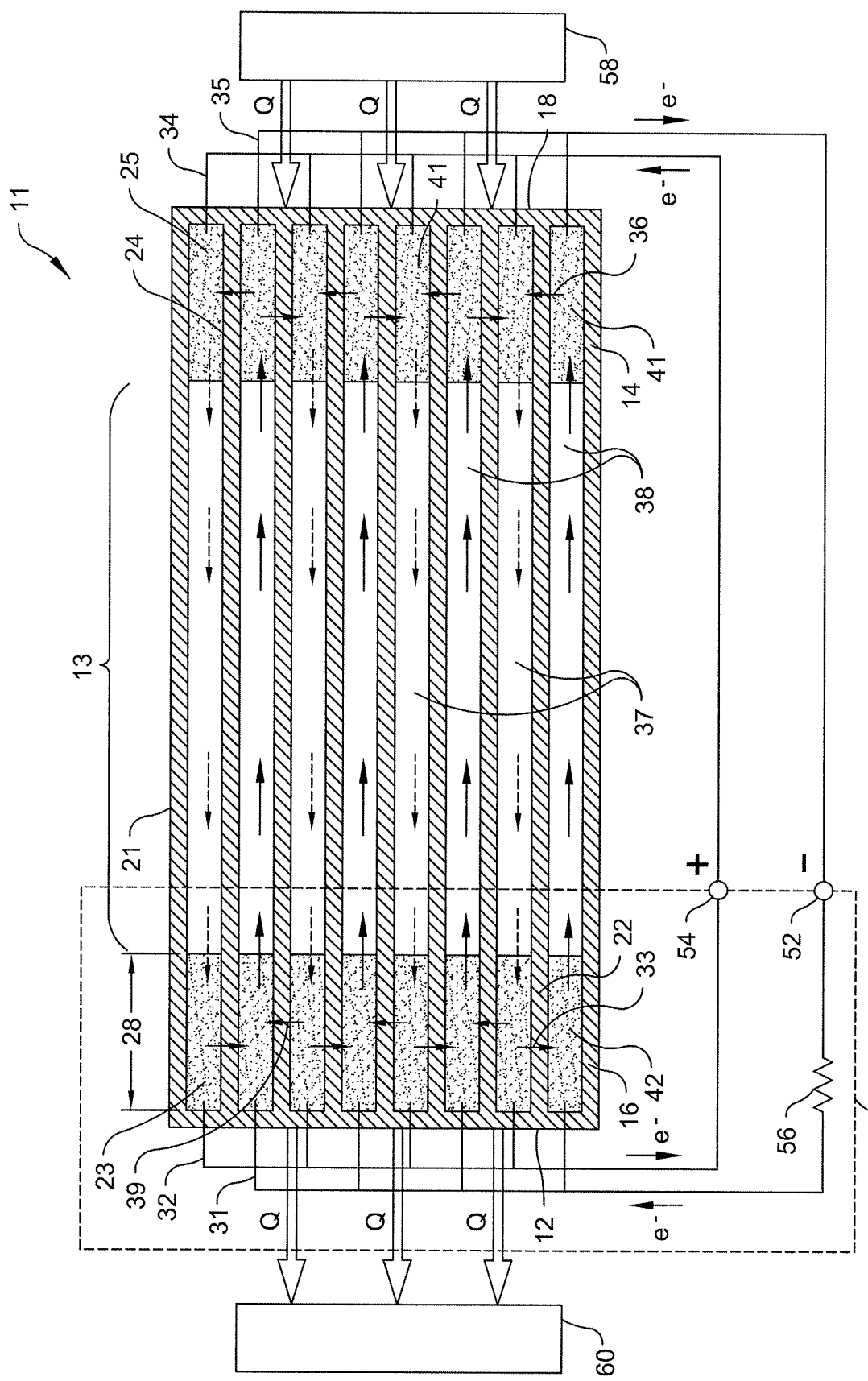
FIG. 7 is a schematic of a heat engine using co-sintered or fused membrane electrode assembly stacks in accordance with an embodiment of the present invention.
Figure 8:
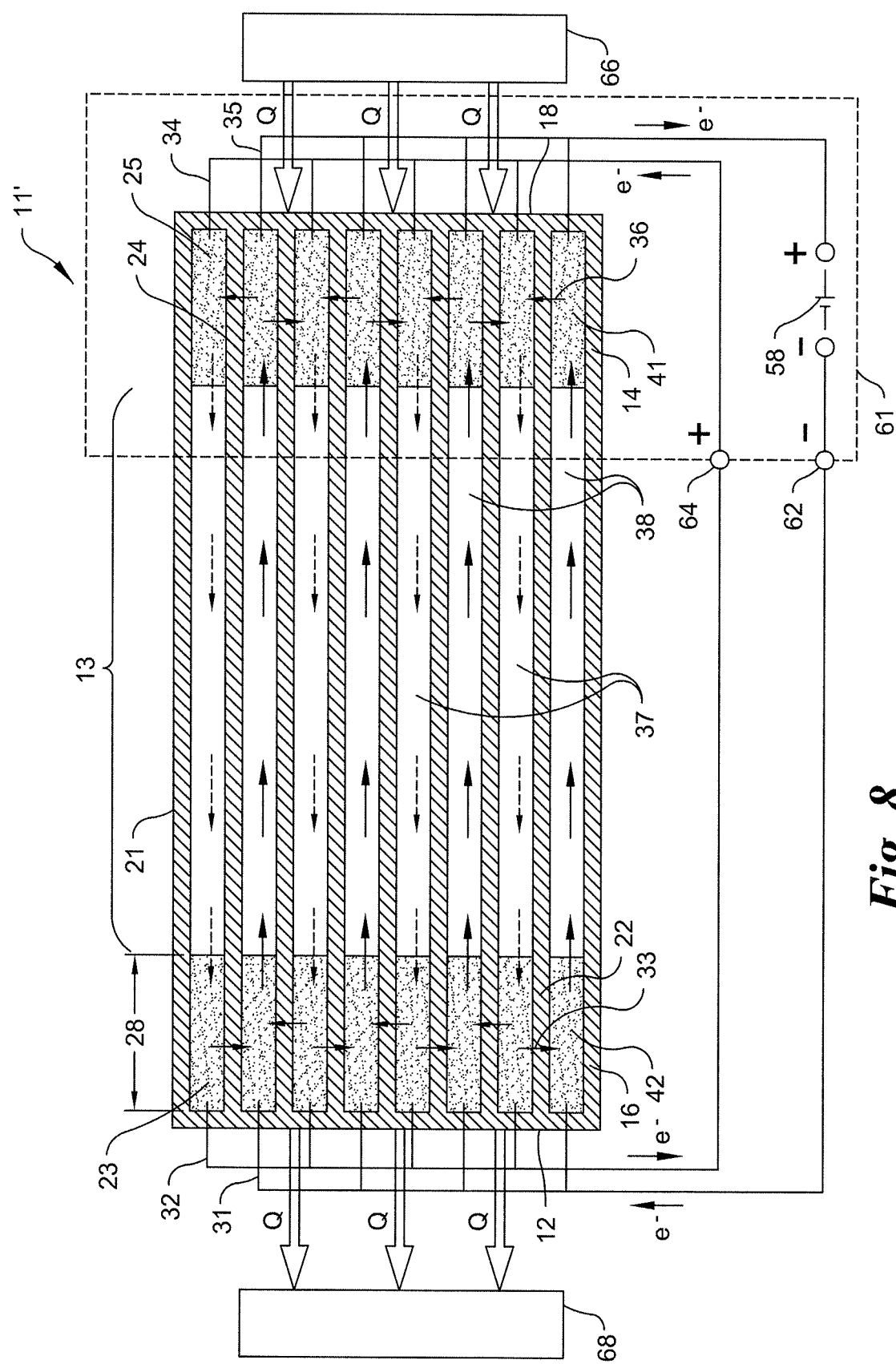
FIG. 8 is a schematic of a heat pump using co-sintered or fused membrane electrode assembly stacks in accordance with an embodiment of the present invention.

Referring to FIGS. 6-8, the first high density MEA stack 14 includes a plurality of porous electrodes 25, 41 and an ion or proton conductive membrane 24 sandwiched between each pair of adjacent electrodes 25, 41. The second high density MEA stack 16 includes a plurality of porous electrodes 23, 42 and an ion or proton conductive membrane 22 sandwiched between each pair of adjacent electrodes 23, 42. In each stack 14, 16, the porous electrodes 25, 41 and 23, 42 are stacked in alternating sequence with the membranes 24, 22.

Referring to FIGS. 5-6, the thermo-electrochemical converter 11 also includes a plurality of conduits 37, 38 and an ionizable working fluid contained within the conduits 37, 38. As discussed above with respect to the MEA stack 10, conduits 38 are high pressure conduits and conduits 37 are low pressure conduits. Preferably, one electrode 41, 42 of any sequential pair of electrodes 25, 41 and 23, 42 is coupled to a high pressure conduit 38 for high pressure flow of the working fluid and the other electrode 23, 25 of the sequential pair of electrodes 25, 41 and 23, 42 is coupled to a low pressure conduit 37 for low pressure flow of the working fluid. Each of the sandwiched membranes 22, 24 is thereby subjected to the pressure differential between a high pressure porous electrode 41, 42 and a low pressure porous electrode 23, 25. The high pressure conduits 38 couple high pressure working fluid flow between the high pressure electrodes 42 of the second MEA stack 16 and the high pressure electrodes 41 of the first MEA stack 14. Similarly, the low pressure conduits 37 couple low pressure working fluid flow between the low pressure electrodes 23 of the second MEA stack 16 and the low pressure electrodes 25 of the first MEA stack 14.

Referring to FIG. 7, in one embodiment, the thermo-electrochemical converter 11 is attached to an external electrical load 56. The first MEA stack 14 is preferably coupled to an elevated temperature heat source 58 and the second MEA stack 16 is preferably coupled to a heat sink 60 which operates at a temperature below the elevated temperature of the first MEA stack 14 and the heat source 58. As such, the first MEA stack 14 is a high temperature stack and the second MEA stack 16 is a low temperature stack. Preferably, the high temperature stack 14 is formed of ceramic materials and the low temperature stack 16 is formed of polymer materials.

The low temperature stack 16 may operate in the range of −50° C. to 1,500° C., preferably approximately 55° C. However, the operating temperature of the low temperature stack 16 must be sufficiently high so as to have heat efficiently removed from it by ambient temperature air, water or other suitable heat sink in its environment. The high temperature stack 14 may operate at temperatures between ambient to as high as 1,500° C., preferably approximately 550° C. Preferably, the high temperature stack 14 operates at a higher temperature than the low temperature stack 16. It will be understood that, for a heat engine generating power, the higher the temperature difference between the two stacks, the greater the engine's theoretical conversion efficiency. Total load 50, which consists of the external load 56 and the second MEA stack 16 connected in series, is coupled to the first MEA stack 14 by first and second terminals 52 and 54.

Still referring to FIG. 7, the first MEA stack 14 supplies power to the total load 50 as pressure forces flow of the working fluid from the first set of high pressure electrodes 41, which are connected to a terminal 35, to the first set of low pressure electrodes 25, which are connected to a terminal 34. The power is supplied at the Nernst voltage of the first MEA stack 14 based on the applied pressure differential and its temperature less the voltage loss due to the internal impedance of the stack 14. Under the force of pressure, electrons are conducted through total load 50 and ions 36 are conducted through the ion conductive membranes 24 of the first MEA stack 14.

The voltage produced by the first MEA stack 14 is divided between the second MEA stack 16 and the external load 56 of total load 50. As configured, a portion of the power produced by the first MEA stack 14 is supplied to the second MEA stack 16 by connection to a second set of high pressure electrodes 42 (i.e., the electrodes connected to the terminal 31) of the second MEA stack 16 and a second set of low pressure electrodes 23 (i.e., the electrodes connected to the terminal 32). Working fluid flow is forced from low pressure to high pressure as the electron flow forced under the applied power induces ion conductivity through the ion conductive membranes 22 of the second MEA stack 16. The remaining power produced by the first MEA stack 14 is supplied to external load 56.

The thermo-electrochemical converter 11' shown in FIG. 8 is also configured as a JTEC and operates as a heat pump. Essentially, the operation of the thermo-electrochemical converter 11' is in reverse to that of the engine 11 of FIG. 7. Referring to FIG. 8, the heat pump 11' is attached to an external power source 58. The first MEA stack 14 is coupled to a low temperature heat source 66 and operates to remove heat from the low temperature heat source 66, thereby creating a refrigeration effect. The low temperature heat source 66 may operate at a temperature of −50° C. to 100° C., and preferably operates at a temperature of approximately 15° C. More preferably, the low temperature heat source 66 operates at a temperature which is sufficiently low to have heat of working fluid expansion effectively transferred to the low temperature heat source 66 from ambient temperature air or water or other suitable heat source in its environment where cooling is desired. The first MEA stack 14 generates power as pressure forces working fluid flow from the first set of high pressure electrodes 41, which are connected to the terminal 35, to the first set of low pressure electrodes 25, which are connected to the terminal 34. Pressure forces working fluid flow through the first MEA stack 14 by forcing ion conduction through ion conductive membranes 22 of the first MEA stack 14, as electrons are conducted through the external power source 58 and the second MEA stack 16 in series.

Still referring to FIG. 8, the external power source 58 and the first MEA stack 14 are connected in series and comprise a total power source 61. The total power source 61 supplies power to the second MEA stack 16 and is connected to the second set of high pressure electrodes 41 (i.e., the electrodes connected to terminal 31) and the second set of low pressure electrodes 23 (i.e., the electrodes connected to terminal 32) within the second MEA stack 16. The working fluid is transferred from the low pressure electrodes 23 to the high pressure electrodes 41 as electron flow forced by the power source 61 induces working fluid ion conduction through the ion conductive membranes 22 of the second MEA stack 16. The first MEA stack 14 is coupled to first and second terminals 62 and 64.

Still referring to FIG. 8, the second MEA stack 16 is coupled to an elevated temperature heat sink 68 and thus operates at higher temperature than the first MEA stack 14. The second MEA stack 16 rejects the heat of compression of the working fluid to the high temperature heat sink 68 for effective operation of the engine as a heat pump 11'. The Nernst voltage of the high temperature second MEA stack 16 is higher than the Nernst voltage of the low temperature first MEA stack 14. The additional voltage needed to overcome the higher Nernst voltage of the high temperature second MEA stack 16 is provided by the external power source 58.

The monolithic structure of the high density direct heat to electricity converter or heat engine 11, and more particularly the co-sintered or fused monolithic structure of the MEA stacks 14, 16, results in a more efficient engine construction process, as compared with conventional converters. This is because the need to make many tedious interconnects and, more importantly, the need to construct thicker and more bulky standalone electrode and membrane layers are unnecessary. For example, a membrane of a conventional converter typically has a thickness on the order of 100 μm in order to have sufficient integrity to survive the construction process. In the converter 11 of the invention, the membranes 22 may be thin coatings on the order of 10 μm or less. The sequential coating of multiple thin layers onto each other or the sequential lamination of multiple thin layer to each other results in a monolithic multilayered structure, wherein the layers mechanically reinforce each other to provide structural integrity while at the same time providing high MEA surface area within a relative small MEA stack volume. The high surface area enables relatively low current density and thereby low resistive losses.

The invention is equivalent to taking fixed source current and dividing it among many high impedance resistors connected in parallel, so that the net result is equivalent to a single low impedance resistor. However, the necessary structure and connections are constructed in a very efficient manner, using screen printing or other suitable techniques to apply multiple coating layers of green ceramic material onto each other and then sintering them into a solid state heat engine having single monolithic structure or using suitable techniques to fuse together multiple polymer foils, films or layers into a solid state heat engine having single monolithic structure.

Figure 9:
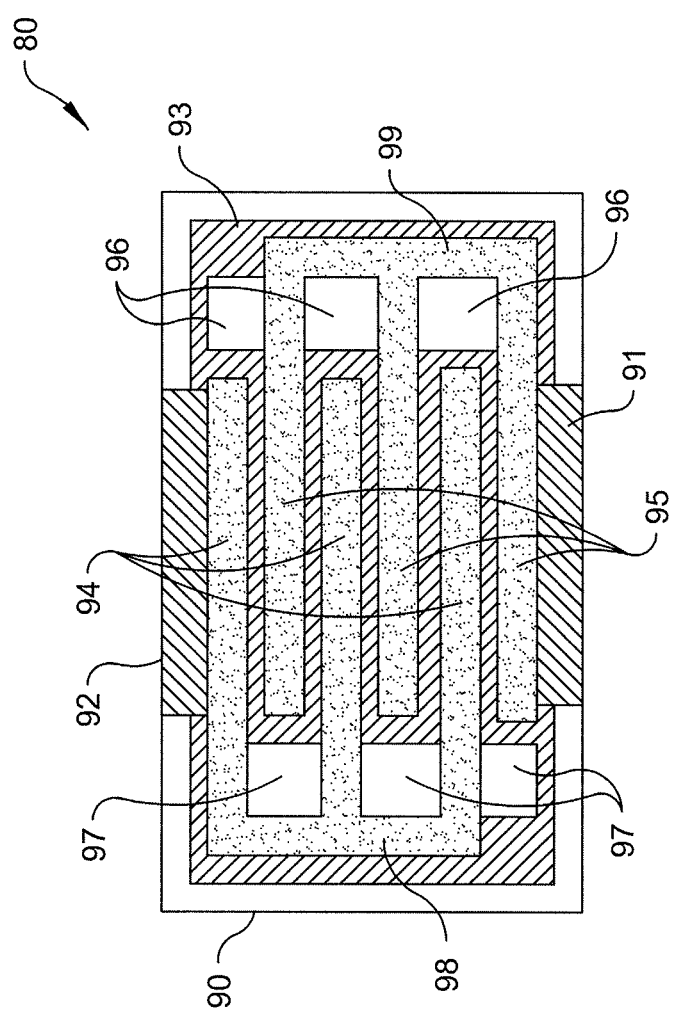
FIG. 9 is a cross-sectional view of a high density co-sintered or fused membrane electrode assembly stack in accordance with an embodiment of the present invention.

Referring to FIG. 9, there is shown a cross-sectional view of a monolithic MEA stack 80 including an outer casing 90, proton conductive membrane material 93, high pressure porous electrodes 94, low pressure porous electrodes 95, high pressure flow conduits 97 and low pressure flow conduits 96. The MEA stack 80 is configured such that high pressure working fluid flowing within the high pressure conduits 97 can freely flow into or out of the high pressure porous electrodes 94. The high pressure porous electrodes 94 are electrically connected to each other by an interconnect 98. Similarly, working fluid flowing within the low pressure conduits 96 can easily flow can into or out of the low pressure porous electrodes 95. The low pressure porous electrodes 96 are connected to each other by an interconnect 99. The interconnects 98 and 99 may or may not be porous. Non-porous electrical terminals 91 (see also FIG. 5) and 92 provide electrical contact points for external electrical connections to the MEA stack 80. Terminal 91 is connected to the low pressure porous electrodes 95 and terminal 92 is connected to the high pressure porous electrodes 94. As FIG. 9 illustrates, with constituent MEAs electrically connected in parallel, connections may similarly be made to connect individual MEA stacks in series for increased net output voltage.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A direct heat to electricity converter having a monolithic structure and comprising:
   a working fluid;
   at least one membrane electrode assembly including a first porous electrode, a second porous electrode and at least one membrane, the at least one membrane being a proton conductive membrane or an ion conductive membrane;
   a first conduit containing the working fluid at a first pressure and a second conduit containing the working fluid at a second pressure which is lower than the first pressure, the first conduit being a high pressure conduit coupled to the first porous electrode and the second conduit being a low pressure conduit coupled to the second porous electrode; and
   an external power source connected to the first and second porous electrodes,
      wherein the at least one membrane is sandwiched between the first porous electrode coupled to the first high pressure conduit and the second porous electrode coupled to the second low pressure conduit;
      wherein the first porous electrode, the second porous electrode, the at least one membrane, the high pressure conduit and the low pressure conduit form a monolithic structure, and
      the converter is configured such that power is applied to the first and second porous electrodes and drives working fluid flow from the second porous electrode to the first porous electrode as electron flow forced by the external power source induces ion or proton conductivity through the at least one membrane.

2. The direct heat to electricity converter according to claim 1, further comprising:
   a plurality of first porous electrodes coupled to a plurality of high pressure conduits and a plurality of second porous electrodes coupled to a plurality of low pressure conduits, the first porous electrodes of the plurality of first porous electrodes being electrically coupled to each other and the second porous electrodes of the plurality of second porous electrodes being electrically coupled to each other,
   wherein the external power source is connected to the plurality of first porous electrodes and the second porous electrodes, power being applied to the electrodes and driving working fluid flow from each low pressure electrode to a respective high pressure electrode as electron flow forced by the external power source induces ion or proton conductivity through the at least one membrane.

3. The direct heat to electricity converter according to claim 2, wherein the plurality of first porous electrodes are electrically coupled to each other by a first electrical interconnect and wherein the plurality of second porous electrodes are electrically coupled to each other by a second electrical interconnect.

4. The direct heat to electricity converter according to claim 1, further comprising a heat sink coupled to the at least one membrane electrode assembly, the heat sink being configured to remove a heat of compression from the working fluid as the working fluid is compressed from the second pressure to the first pressure, so as to maintain the compression at a relative constant process temperature as electricity is consumed by compression of the working fluid through the at least one membrane.

5. The direct heat to electricity converter according to claim 4, further comprising:
   a plurality of first porous electrodes coupled to a plurality of high pressure conduits and a plurality of second porous electrodes coupled to a plurality of low pressure conduits, said first porous electrodes being electrically coupled to each other and said second porous electrodes being electrically coupled to each other, and
   an external load connected across the plurality of first porous electrodes and the plurality of second porous electrodes, the converter supplying power to the external load as pressure forces working fluid flow from each first porous electrode to each second porous electrode as electrons are conducted through the external load and ions or protons are conducted through the at least one membrane.

6. The direct heat to electricity converter according to claim 5, further comprising a heat source configured to supply heat to the at least one membrane electrode assembly for heat of expansion to the working fluid expanding from the first pressure to the second pressure so as to maintain the expansion at a relative constant temperature as electricity is produced by working fluid expansion through the at least one membrane.

7. The direct heat to electricity converter according to claim 5, wherein the at least one membrane is formed of a ceramic conductive material or a polymer conductive material.

8. A direct heat to electricity converter having a monolithic structure and comprising:
   at least four porous electrodes;
   a working fluid;
   at least two ion or proton conductive membranes, the porous electrodes being stacked with the membranes in an overlapping configuration whereby each membrane is sandwiched between a pair of porous electrodes, the porous electrodes and the membranes comprising a co-sintered or fused monolithic structure;
   at least four conduits, each conduit being coupled to one of the porous electrodes, at least one of the conduits containing the working fluid at a first pressure and being coupled to a first porous electrode of each pair of porous electrodes and at least another one of the conduits containing the working fluid at a second pressure which is lower than the first pressure and being coupled to a second porous electrode of each pair of porous electrodes, the first porous electrode being a high pressure electrode and the second porous electrode being a low pressure electrode; and
   an electrical power source, the power source being coupled between the pair of porous electrodes wherein the converter is configured such that power applied to the porous electrodes forces a flow of the working fluid flow from the low pressure electrode to the high pressure electrode as electron flow is forced by the external power source and induces ion or proton conductivity through the membrane.

9. The direct heat to electricity converter according to claim 8, wherein the porous electrodes are electrically connected in series with each other so as to produce a higher MEA voltage.

10. The direct heat to electricity converter according to claim 8, further comprising an electrical load, the electrical load being coupled between the pair of porous electrodes whereby pressure forces flow of the working fluid from the high pressure electrode to the low pressure electrode by means of electrons being conducted through the external load and ions or protons being conducted through the membrane sandwiched between the pair of porous electrodes.

11. A thermo-electrochemical converter comprising a first membrane electrode assembly stack and a second membrane electrode assembly stack, each of the first and second membrane electrode assembly (MEA) stacks comprising:
at least three porous electrodes;
a working fluid;
at least two ion or proton conductive membranes, the porous electrodes being stacked in an alternating sequence with the membranes;
at least three conduits containing the working fluid, at least one of the conduits being a high pressure conduit containing the working fluid at a first pressure and at least another one of the conduits being a low pressure conduit containing the working fluid at a second pressure which is lower than the first pressure; and
an external power source,
  wherein a first porous electrode of any sequential pair of the porous electrodes in each MEA stack is coupled to the high pressure conduit for high pressure working fluid flow therethrough and a second porous electrode of the sequential pair of the porous electrodes is coupled to the low pressure conduit for low pressure working fluid flow therethrough, such that each of the membranes is subjected to a pressure differential between the pair of porous electrodes, the first porous electrode being a high pressure electrode and the second porous electrode being a low pressure electrode, the external power source being connected to the first and second porous electrodes,
  wherein the converter is configured such that power is applied to the first and second porous electrodes and drives working fluid flow from the second porous electrode to the first porous electrode as electron flow forced by the external power source induces ion or proton conductivity through the at least one membrane,
  wherein the high pressure conduit couples high pressure working fluid flow between the high pressure electrodes in the first MEA stack and the high pressure electrodes in the second MEA stack,
  wherein the low pressure conduit couples low pressure working fluid flow between the low pressure electrodes in said first MEA stack and the low pressure electrodes in the second MEA stack, and
  wherein at least one of the MEA stacks is a high density multilayered MEA stack having a monolithic structure.

12. The thermo-electrochemical converter according to claim 11, wherein the converter is attached to an external load, the first MEA stack being coupled to a heat source and operating at an elevated temperature and the second MEA stack being coupled to a heat sink and operating at a temperature below the elevated temperature,
  wherein a total load is coupled to the first MEA stack whereby power is supplied to the total load as pressure forces working fluid flow from the high pressure electrodes to the low pressure electrodes of the first MEA stack by means of electrons being conducted through the total load and ions or protons being conducted through the ion or proton conductive membranes of the first MEA stack, and
  wherein the total load comprises a series connection of the external load and the second MEA stack, whereby a portion of power produced by the first MEA stack is coupled to the high and low pressure electrodes of the second MEA stack to force working fluid flow from low pressure to high pressure as the electron flow is forced by the power and induces ion or proton conductivity through said the ion or proton conductive membranes of the second MEA stack, whereas any remaining power produced by the first MEA stack is supplied to the external load.

13. The thermo-electrochemical converter according to claim 12, wherein the first MEA stack comprises ceramic materials and the second MEA stack comprises polymeric materials.

14. The thermo-electrochemical converter according to claim 11, wherein the converter is configured to operate as a heat pump, the first MEA stack being coupled to a heat sink and operating at a low temperature and the second MEA stack being coupled to a heat source and operating an elevated temperature above the low temperature,
  wherein the external power source and the first MEA stack operate together as a total power source, the total power source supplying power to the second MEA stack, the total power source being connected to the high and low pressure electrodes of the second MEA stack within the first MEA stack, the power forcing working fluid flow from the low pressure electrodes to the high pressure electrodes as electron flow forced by the power source induces ion or proton conductivity through the ion or proton conductive membranes of the second MEA stack, and
  wherein the total power source comprises an electrical series connection of the external power source and the first MEA stack, power being generated within the first MEA stack as pressure forces working fluid flow from the high pressure electrodes to the low pressure electrode of the first MEA stack by means of ions or proton being conducted through the ion or proton conductive membranes of the first MEA stack and electrons are conducted through the external power source and the second MEA stack in series.

15. The thermo-electrochemical converter according to claim 14, wherein the first MEA stack comprises polymeric materials and the second MEA stack comprises ceramic materials.

16. The thermo-electrochemical converter according to claim 14, wherein the heat pump further includes a recuperative heat exchanger, the heat exchanger including the high and low pressure conduits configured to enable transfer of heat between the high pressure fluid and the low pressure fluid.

17. The thermos-electrochemical converter according to claim 11, further comprising a recuperative heat exchanger, the heat exchanger including the high and low pressure conduits configured to enable transfer of heat between high pressure fluid and said low pressure fluid.

* * * * *